ns(12) United States Patent
Aquarius (10) Patent No.: US 7,941,990 B2
(45) Date of Patent: May 17, 2011

(54) APPARATUS FOR PACKAGING PRODUCTS INTO A CONTAINER

(75) Inventor: Pieter Theodorus Joseph Aquarius, Kinrooi (BE)

(73) Assignee: PI-WI Beheer B.V., AP Stramproy (NL)

( * ) Notice: Subject to any disclaimer, the term of this patent is extended or adjusted under 35 U.S.C. 154(b) by 137 days.

(21) Appl. No.: 12/349,076

(22) Filed: Jan. 6, 2009

(65) Prior Publication Data

US 2010/0170201 A1 Jul. 8, 2010

(51) Int. Cl.
*B65B 21/00* (2006.01)
(52) U.S. Cl. ............... 53/48.1; 53/147; 53/247; 53/446
(58) Field of Classification Search ............ 53/446, 53/48.1, 48.7, 147, 169, 245, 247, 249, 251, 53/259, 260, 261, 263, 493; 198/464.1, 416, 198/431
See application file for complete search history.

(56) References Cited

U.S. PATENT DOCUMENTS

| | | | | |
|---|---|---|---|---|
| 3,614,853 A | * | 10/1971 | Seragnoli | 53/74 |
| 4,386,491 A | * | 6/1983 | Cramer et al. | 53/247 |
| 4,467,664 A | * | 8/1984 | Willigman et al. | 74/116 |
| 5,123,231 A | * | 6/1992 | Fallas et al. | 53/493 |
| 5,414,973 A | * | 5/1995 | Muller | 53/259 |
| 5,457,942 A | * | 10/1995 | Mantovani | 53/463 |
| 5,495,932 A | * | 3/1996 | Dyess | 198/464.1 |
| 5,588,285 A | * | 12/1996 | Odenthal | 53/534 |
| 5,660,262 A | * | 8/1997 | Landrum et al. | 198/411 |

* cited by examiner

*Primary Examiner* — Sameh H. Tawfik
(74) *Attorney, Agent, or Firm* — Weingarten, Schurgin, Gagnebin & Lebovici LLP (57) ABSTRACT

An apparatus for packaging products into a container, comprising a first supply conveyor (10); reorientation means (60, 62), associated with said first supply conveyor and configured for selectively changing the orientation of products (74-76, 81) being transported thereon; a second supply conveyor (20), disposed downstream of the first supply conveyor and having a product-carrying surface (21) that is moveable in both a transport direction and a direction substantially perpendicular thereto; a collecting conveyor (30), disposed downstream of the second supply conveyor, whereby a portion of the third product-carrying surface is extendably and retractably arranged; and a suction pick up head (66) that is disposed in a substantially vertically moveable manner above the retractable portion of the collecting conveyor, the suction pick up head being configured for engaging a layer of products to be placed into the container (90).

19 Claims, 9 Drawing Sheets

APPARATUS FOR PACKAGING PRODUCTS INTO A CONTAINER

TECHNICAL FIELD

The present disclosure relates to an apparatus for packaging products, in particular inflexible and semi-flexible products, into a container.

BACKGROUND

Before products, such as for example deep-drawn packed foodstuffs, are shipped off from a production site, they are typically packaged into easily manageable containers such as crates, cases or trays. To prevent the packaging stage from being a bottleneck in the production process, and to minimize the costs of both packaging and shipping, machines capable of reliably and efficiently packaging products are essential.

Contemporary packaging machines often use a robotic gripper that engages one or more products at a pick up location, moves the product(s) from said pick up location to an awaiting container and then places the product(s) inside the container. A drawback of this type of packaging machine is that the robotic gripper may easily drop a product during its actions. This is especially so when the product does not retain its shape while being handled, and/or when the movement of the robotic gripper between the pick up location and the container—due to the required speed of the packaging process—involves relatively large accelerations and decelerations. Furthermore, when it comes to accurately positioning a product within a container, in particular in the corners thereof, a robotic gripper is often not up to the task. This a consequence of the fact that a robotic gripper typically at least partially surrounds/encloses a product, such that that it cannot place a product tightly into the corner of a container due to impeding contact with the container walls.

The present disclosure is directed, at least in part, to improving or overcoming some aspects of known packaging machines.

SUMMARY OF THE INVENTION

In a first aspect of the disclosure, an apparatus suitable for packaging products into a container is provided. The apparatus may include a first supply conveyor having a first product-carrying surface that is moveable in a transport direction, and reorientation means associated with said first supply conveyor and configured for changing the orientation of products being transported on said first product-carrying surface. The apparatus may further include a second supply conveyor, disposed downstream of the first supply conveyor and having a second product-carrying surface that is moveable in both the transport direction and a direction perpendicular thereto. In addition, the apparatus may include a collecting conveyor, disposed downstream of the second supply conveyor and having a third product-carrying surface that is moveable in the transport direction, whereby a portion of the third product-carrying surface is extendably and retractably arranged. The apparatus may also include a suction pick up head that is disposed in a substantially vertically moveable manner above the retractable portion of the collecting conveyor, the suction pick up head being configured for engaging a layer of products to be placed into the container.

In operation, the first supply conveyor may sequentially receive products from a discharge end of a production machine, and transport them on in the transport direction. Depending on a desired packing pattern of the layer of products to be formed, the reorientation means may meanwhile change the orientation of individual products in such a way that successive products may be slidingly assembled into a single product layer at a later stage. The first supply conveyor may feed the stream of desirably (re)oriented products to the second supply conveyor, which is capable of moving an individual product in a direction transverse to the transport direction before or while transporting it on to the collecting conveyor. The product-carrying surface of the collecting conveyor may serve as a location for assembling the layer of products. Once the layer is assembled, the suction pick up head may engage the individual products, thereby maintaining their relative orientations, and hold them while the retractable portion of the third product-carrying surface retracts from underneath. Subsequently, the suction pick up head may lower the layer into an awaiting container.

The apparatus according to the present disclosure offers several advantages relative to known packaging machines featuring robotic grippers. With the disclosed apparatus, for example, products may be accurately assembled into layers prior to placement in a container, and without picking them up to rearrange them according to a certain packing pattern. Rearranging the products while they are being transported on the product-carrying surface of a supply conveyor prevents deformation of and/or damage to the products that might occur when a gripper grabs (and possibly deforms) and/or accidentally drops them. In addition, assembling each layer of products before placing it into the container allows for an excellent packing density: each layer is placed into the container as a whole, and while being held from above. Therefore, inner edges of the adjacent products in the plane of the layer may touch each other, while the outer edges of the outer products in the layer may touch the inner surface of the container. Accordingly, corners of a container may be filled perfectly if the geometry of the products so allows. Also, since the suction pick up head does not need to move the layer of products laterally, which would involve lateral acceleration and deceleration of the products and would thus demand a firm grip on the products, handling of the products can be very gentle: they merely need to be lowered. Furthermore, due to the continuity of the packing process the apparatus is capable of achieving a capacity (in packaged products per hour) that is approximately 40-50% greater than that obtainable by known packaging machines having robotic grippers.

With regard to the terminology in this text, the following is noted. The term 'product-carrying surface' is used to indicate a surface, surface part or collection of fractional surfaces that is capable of supporting one or more products from below. The term 'transport direction' is meant to indicate a downstream direction of the packaging process. From a physical point of view the transport direction may change along the downstream path of products to be packaged, and use of the term 'transport direction' thus does not necessarily imply a linear path.

The above-identified and other features and advantages of the apparatus according to this disclosure will be more fully understood from the following detailed description of certain embodiments, taken together with the accompanying drawings.

DETAILED DESCRIPTION

Figure 1:
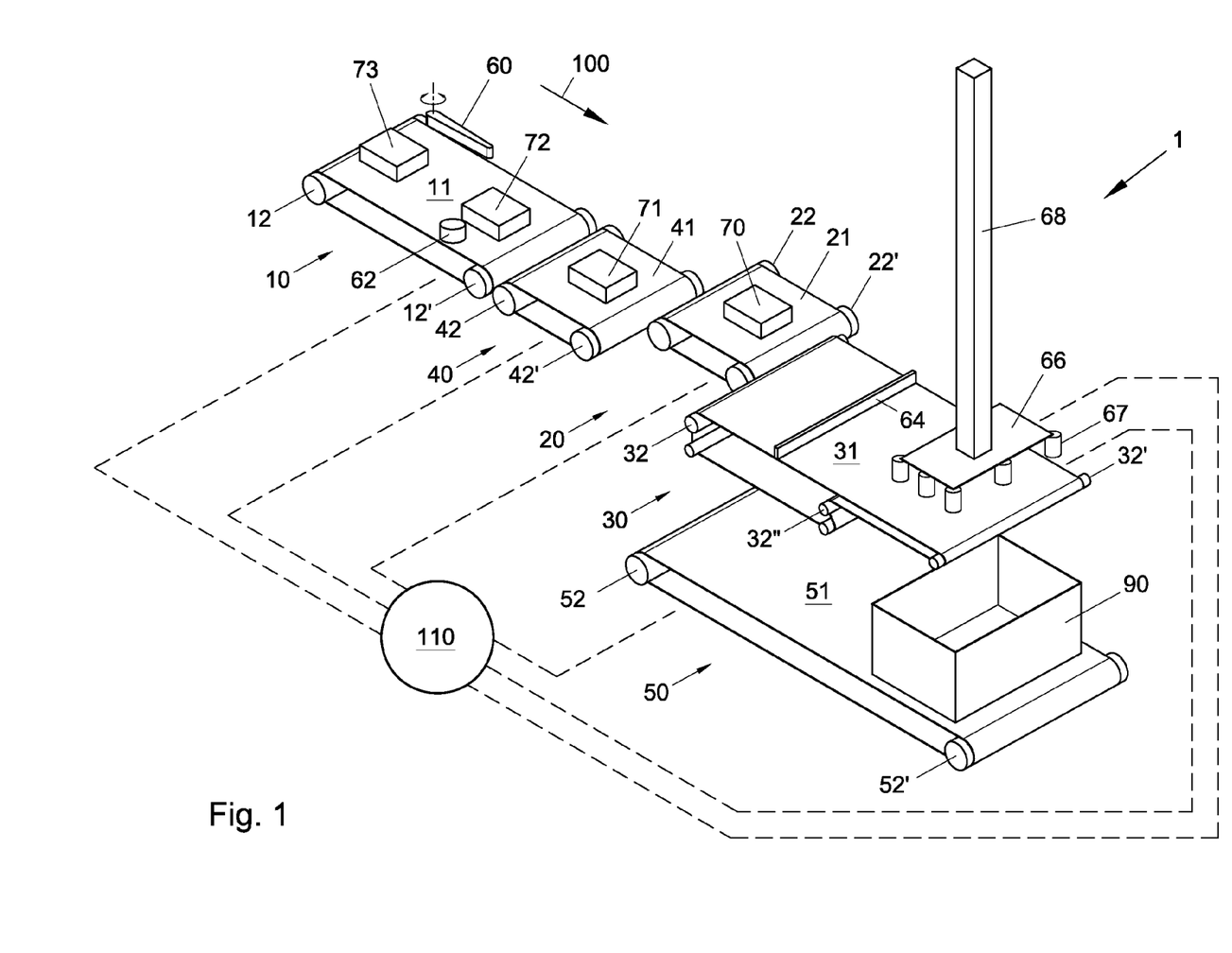
FIGS. 1-9 schematically show a perspective view of an exemplary embodiment of an apparatus according to the present disclosure, whereby the figures illustrate successive stages in the continuous process of forming layers of products that, upon completion, are packaged into a container.

FIG. 1 schematically illustrates a perspective view of an exemplary embodiment of an apparatus 1 according to the present disclosure. The same embodiment is also shown in FIG. 2-9 at different stages of a packaging process. Below, first the elements of the embodiment will be described with reference to FIG. 1. Then the operation of the embodiment as a whole will be elucidated.

Referring now in particular to FIG. 1. Depicted are a first supply conveyor 10, an intermediate supply conveyor 40, a second supply conveyor 20, a collecting conveyor 30 and a discharge conveyor 50. All conveyors 10-50 are depicted as belt conveyors, having a endless, closed-surface belt. Each belt provides a product-carrying surface 11-51 and is tightened between and may revolve around two or more cylindrical bodies 12,12'-52,52' which may be driven by a drive mechanism. Though belt conveyors are reliable, and very well suited for the present application as they can support products of varying sizes, other types of conveyors, such as chain conveyors or roller conveyors, may be used as well.

Associated with the first supply conveyor 10 are reorientation means in the form of a deflection device, more in particular a deflection arm 60, and a turn body 62. In the embodiment of FIG. 1, the deflection arm 60 is disposed to the side of the first supply conveyor 10. It may be powered to swing sideways, across the product-carrying surface 11, into a first position in order to form an obstacle for a product 74-76, 81 that is being conveyed by conveyor 10 (see FIG. 2). Contact between a moving product 74-76, 81 and the deflection arm 60 may cause a reorientation of the product, and a deflection of its path. When no reorientation or deflection of a passing product 70-73, 77-80 is desired, the deflection arm 60 may be held in a second position, in which it does not interfere with the path of the product (see FIG. 1).

Turn body 62 is disposed downstream of the deflection arm 60, and slightly above the product-carrying surface 11 of the first supply conveyor 10. Turn body 62 may preferably possess a substantially smooth and rounded circumferential edge for contacting products being transported on the first product-carrying surface, so as to allow a precise, non-jerky reorientation. In FIG. 1, turn body 62 is depicted as a cylinder having a circular cross-section (in a plane parallel to the first product-carrying surface 11), though in other embodiments the turn body may have a differently shaped cross-section, such as elliptical or polygonal.

The arrangement of the deflection arm 60 and the turn body 62 is such that a product 74-76, 81 being transported by the first supply conveyor 10, and after being reoriented and deflected from its path by the deflection arm 60, will gently collide with the turn body 62. Due to the ongoing motion of the first product-carrying surface 11, the product 74-76, 81 will undergo a further reorientation while leaning against the turn body 62, until it eventually comes loose off and passes by said body. This sequence of events will be elucidated further below.

Regarding the reorientation means, it will be clear to one skilled in the art that a variety of devices may be used to reorient a product and/or to deflect a product from its mapped out path on first supply conveyor 10. Such devices may, for example, include passive guides that may be lowered from above to a position just above the first product-carrying surface 11, and devices that actively seize a product 73-75 to reorient it. Preferably, a product 74-76, 81 is not lifted off the first substrate-carrying surface 11 when it is being reoriented. Accordingly, reorientation means that seize a product may do so very gently, as there is no risk of dropping it. It is also noted that the dimensions of the reorientation means, more in particular of the deflection arm 62 and the turn body 62, may preferably be adapted to the dimensions of the products that are to be reoriented. Larger products may for example require a longer deflection arm 60 and a (cylindrical) turn body 62 having a larger radius. Relative to many other reorientation means, the discussed deflection arm 60 and turn body 62 offer the advantage of being structurally simple, and therefore reliable and economically manufacturable.

Second supply conveyor 20 differs from first supply conveyor 10 in that it is moveable in a direction transverse to the transport direction 100 of its substrate-carrying surface 21. To enable such transverse movement, the cylindrical rollers 22, 22' of conveyor 20 may, for example, be mounted on a carriage (not shown) that is moveable back and forth along a rail (not shown) that runs in a direction transverse to the transport direction 100. Obviously, moving the conveyor 20 as a whole implies moving its substrate-carrying surface 21, and with it any products resting thereon.

Collecting conveyor 30 differs from first supply conveyor 10 in that it comprises a retractable and extendable product-carrying surface 31 portion. In FIG. 1, this is roughly the portion of the product-carrying surface 31 located below the suction pick up head 66. To allow said portion of the product-carrying surface 31 to be retracted and extended, the belt of conveyor 30 is tightened around a number of cylindrical rollers, two of which 32', 32" are displaceable in a direction parallel to the transport direction 100. Typically, roller 32 may be moveable by a controllable translational drive mechanism, whereas roller 32" may be configured to follow the movement of roller 32 in order to take up any slack in the belt of conveyor 30. One skilled in the art will appreciate that (belt) conveyors having a retractable and extendable surface portion are known in the art, and that various designs may fit the purpose of the present disclosure.

Associated with the collecting conveyor 30 are a stop 64 and a suction pick up head 66. The stop 64 may be formed by a vertically moveable object that may be lowered to a first position just above the product carrying surface 31. In this first, lowered position it may serve as a barrier for products 70-81 being transported on the product carrying surface 31. The stop 64 may be raised from its lowered position to a second, higher position allowing products to pass underneath. Preferably, the stop 64 is provided with a flat stop surface that extends in a direction transverse to the transport direction of the collecting conveyor 30. In alternative embodiments of apparatus 1, the stop 64 may be omitted or be implemented differently, for example in the form of an arm that may rotatably swing sideways across the product-carrying surface 31 (cf. arm 60). In the latter case, the angular velocity with which the arm may be swung is preferably great enough to ensure that different products, lined up against the arm on an upstream side thereof, loose contact with the arm at practically the same time. Otherwise some products may contact the arm while at the same time being moved by the product-carrying surface 31, and consequently push sideways against neighboring products. This would cause a shear effect and distortion of the packing pattern. A vertically moveable stop 64 inherently overcomes this possible problem.

The suction pick up head 66 may be mounted on a lower end of a connecting rod 68, which itself may be part of a drive mechanism. The connecting rod 68 may be moveable in a substantially vertical direction so as to lower and raise the suction pick up head 66. The suction pick up head 66 may be of a conventional design, including a number of suction cups 67 that are configured for engaging the products 70-81. Preferably, the cross-sectional dimensions of the suction pick up head 66 correspond the to the cross-sectional/floor area dimensions of a container 90 to be filled, thus allowing the suction pick up head 66 to be lowered into the container 90 before releasing a layer of products. In an advantageous embodiment, the suction pick up head 66 may be detachably attached to the connecting rod 68, for example by means of a click system. This would allow suction pick up heads 66 of various cross-sectional dimensions, corresponding to different container sizes, to be easily exchanged and used with apparatus 1.

Below the suction pick up head 66 and the retractable part of the collecting conveyor 30 awaits a container 90 to be filled. The container 90 may preferably have a rectangular cross-section, and for example be a box, a crate, a tray etc. The depicted container 90 rests upon the product-carrying surface 51 of discharge conveyor 50, which conveyor may supply empty containers 90 to the loading position shown in FIG. 1, and after being filled, to a discharge point from where the containers are loaded into a transport vehicle to be shipped off.

The above-described moveable parts of apparatus 1—such as the conveyors 10-50, the deflection arm 60, the carriage upon which the second supply conveyor 20 may be mounted, the stop 64 and the suction pick up head 66—may be powered/actuated by a variety of conventional drive mechanisms, including electromotors, hydraulic and pneumatic cylinders and linear electric drives. To automatize the operation of apparatus 1, all these drive mechanisms may be individually subjected to the control of a programmable control unit 110. In addition, a mechanism for activating the suction pick up head 66 may, of course, also be linked to the control unit 110. The control unit 110 may be configured to control the components of the apparatus 1 so as to repeatedly form a layer of products on the third product-carrying surface 31, said layer having dimensions that substantially correspond to the dimensions of a floor area of the container 90 to be loaded, and to repeatedly place a completed layer of products into the container.

Having described the individual elements depicted in FIG. 1, reference is now made to the series of FIGS. 2-9 to elucidate the operation of apparatus 1. The products to be packed may, when viewed from above, have a rectangular configuration and may have different dimensions in a width direction and a length direction of the product. The length direction of a product will be indicated in the following by the longitudinal axis of the product. Previously and in the following the terminology "reorientation" and "orientation" has been used. It should be noted that with the term "reorientation" it is intended to refer to changing the angular position of a product around a vertical axis of the product. The term "orientation" is directed to the angular position of a product around a vertical axis of the product.

Figure 2:
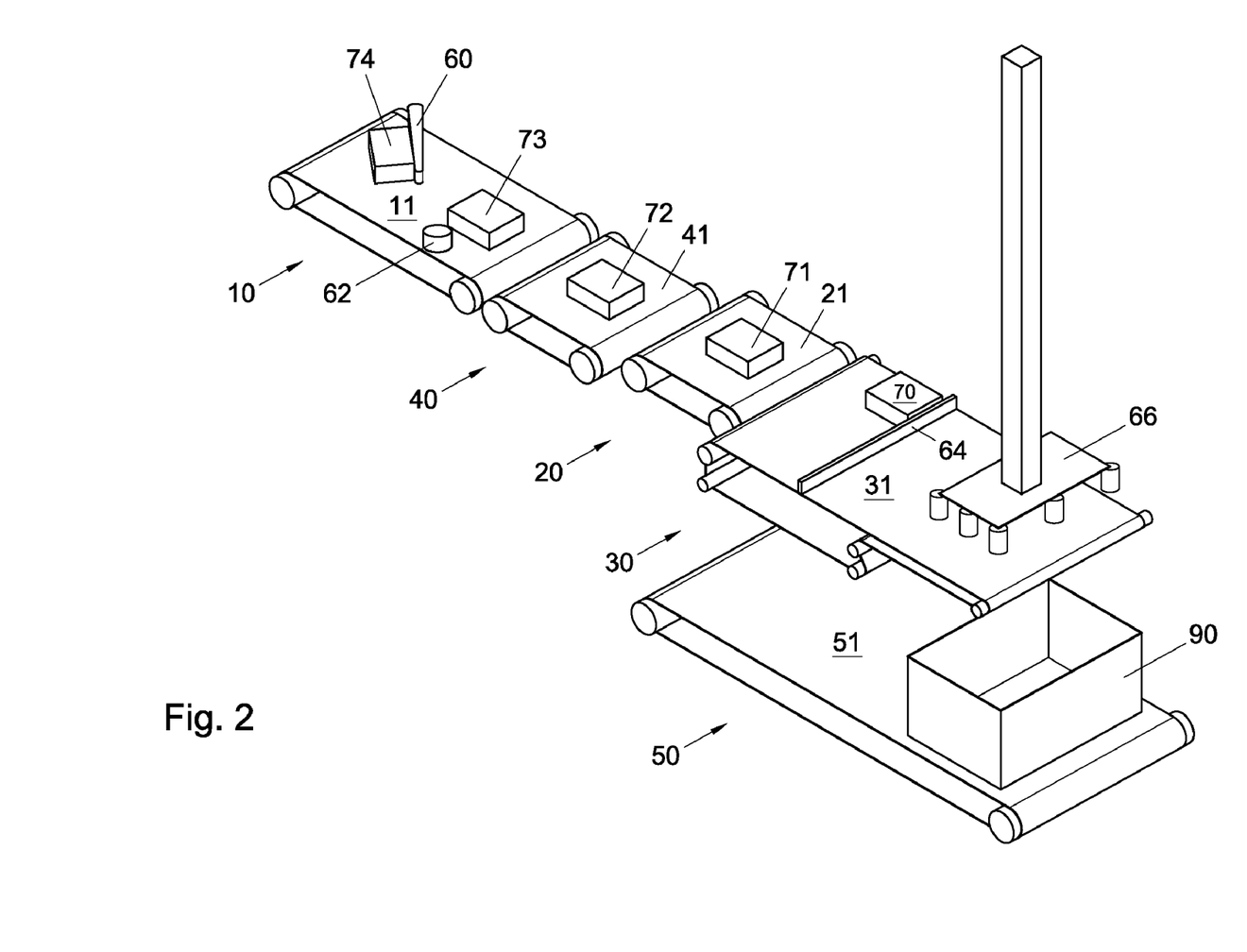
Figure 3:
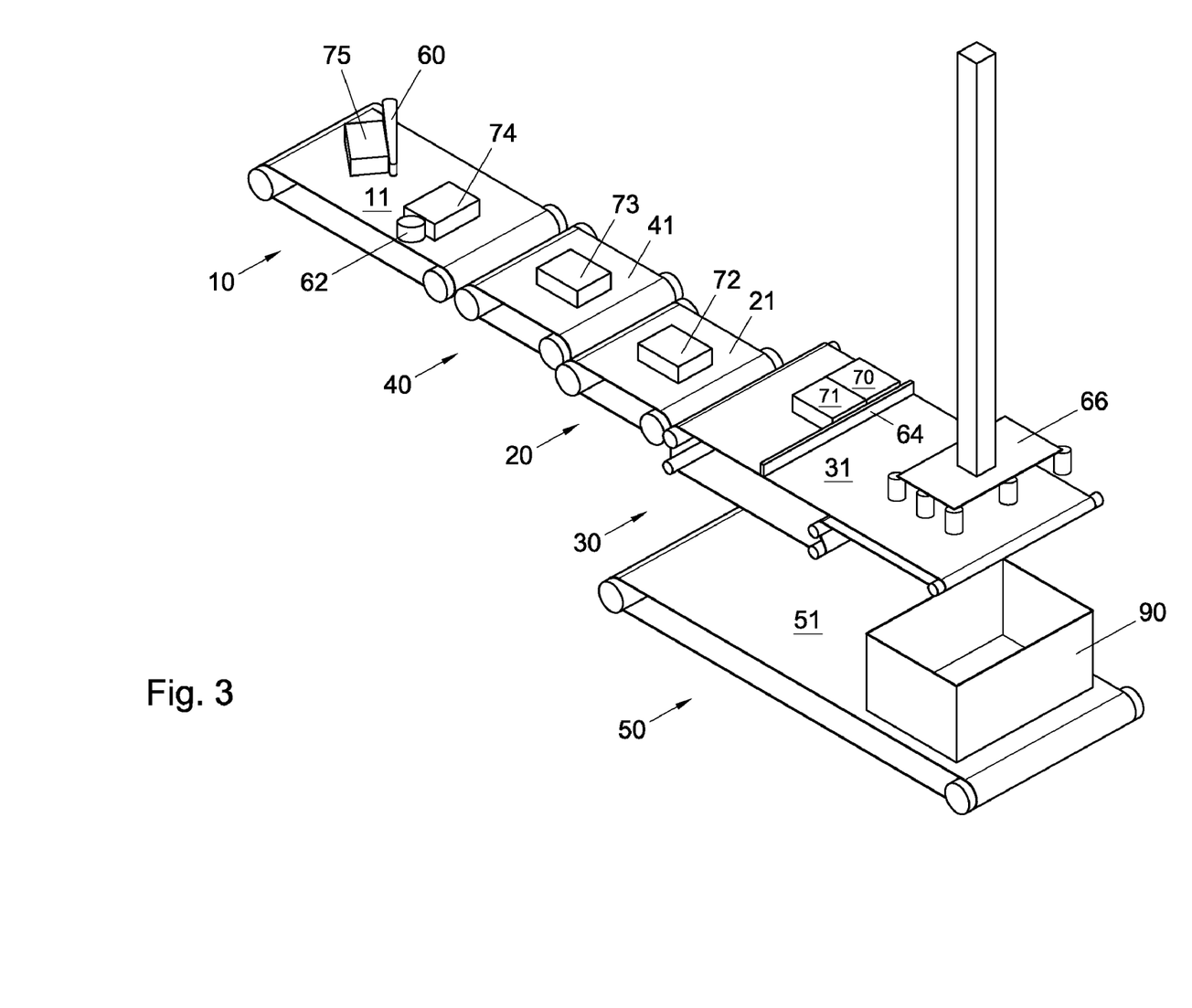

FIG. 2 depicts the supply of a series of products 70-74 to be packaged. To illustrate the operation of the apparatus 1, starting with the reorientation means 60, 62, attention is invited to product 74 on first supply conveyor 10. Since the product 74 is to be packaged with its longitudinal axis parallel to the longitudinal axis of the container 90, deflection arm 60 has been activated to reorient the product 74. The deflection arm 60 has been rotated across the product-carrying surface 11 of conveyor 10, and now abuts a longitudinal side of the product 74. Due to the ongoing motion of the product-carrying surface 11, product 74 will slide along the deflection arm 60 in a downstream direction towards turn body 62. Once product 74 contacts turn body 62, or when product 74 has reached a lateral position on the product-carrying surface 11 that will bring it into contact with turn body 62, the deflection arm 60 may be swung back into its starting position (shown in FIG. 1). When product 74 contacts turn body 62, it will smoothly turn around it under the influence of the still ongoing motion of the product-carrying surface 11, until it finally reaches the orientation shown in FIG. 3.

Figure 4:
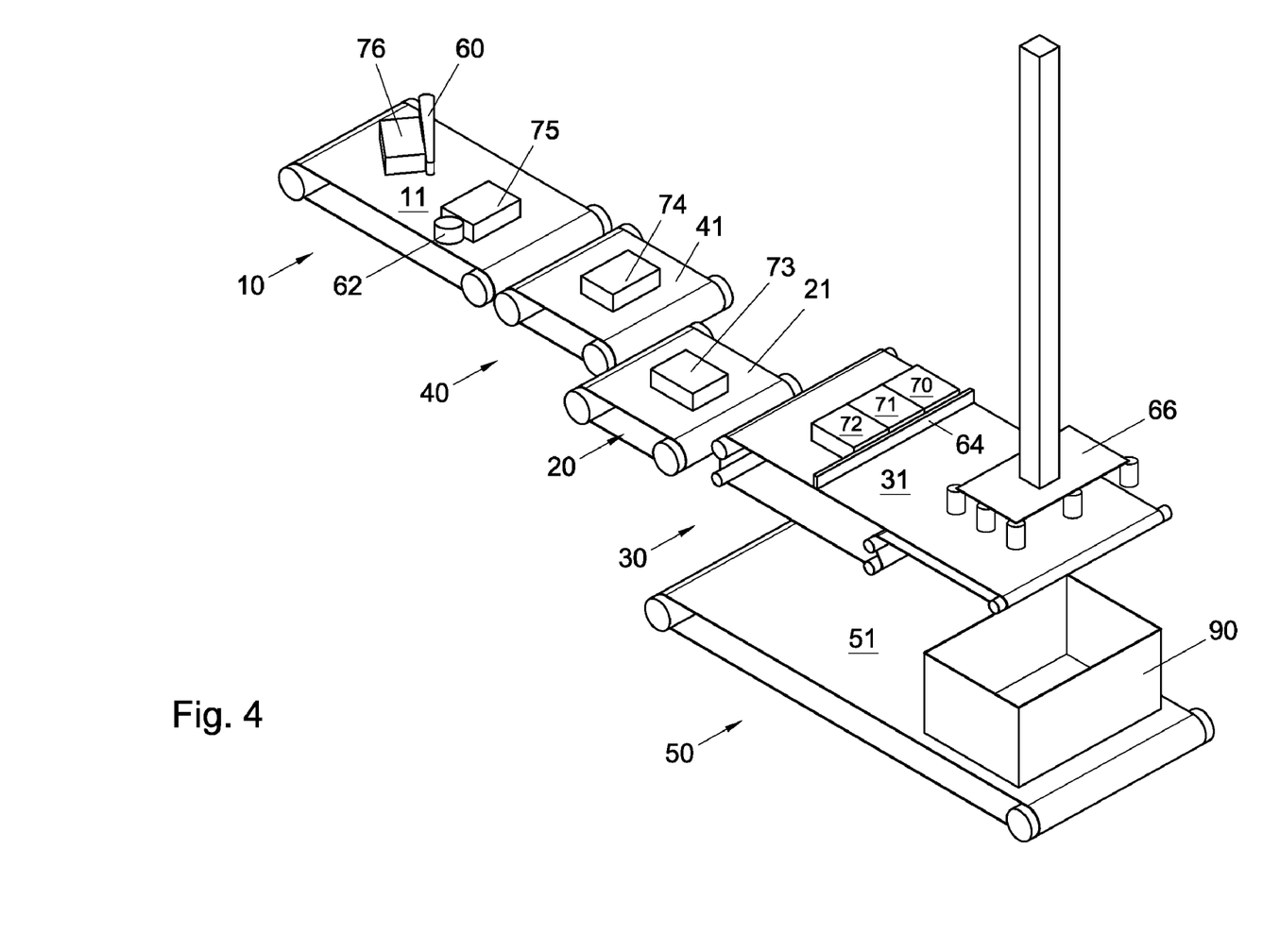
Figure 5:
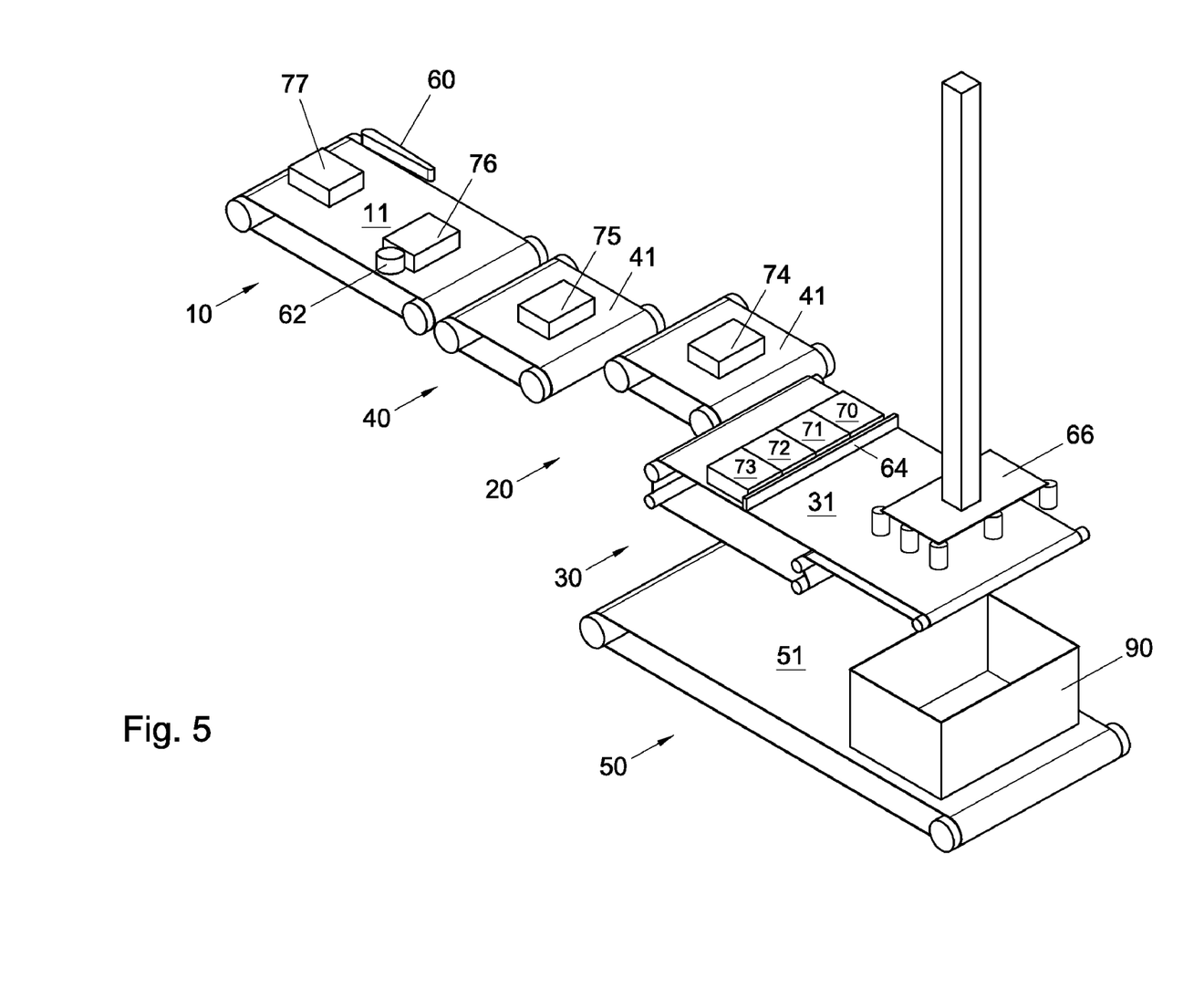
Figure 6:
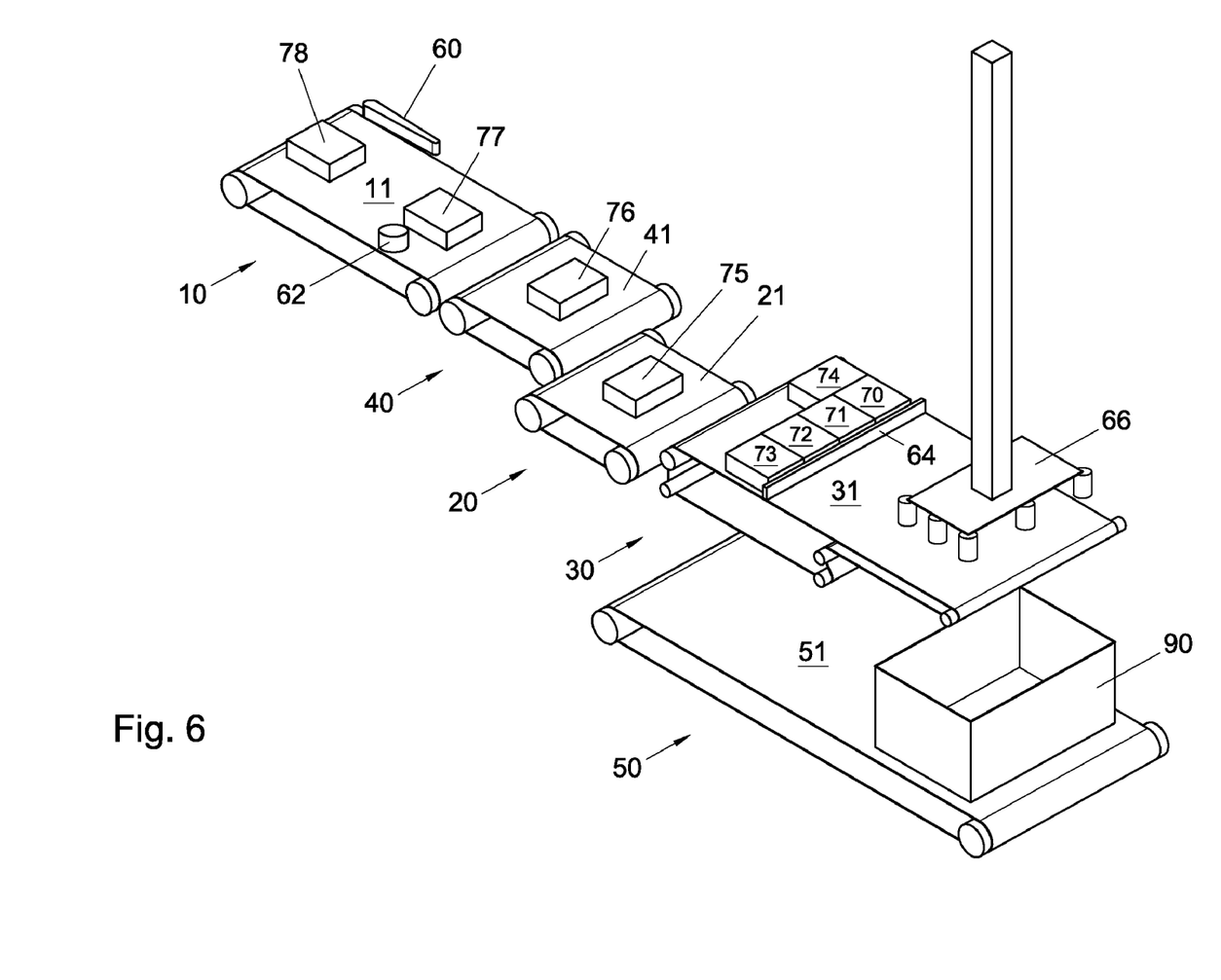
Figure 7:
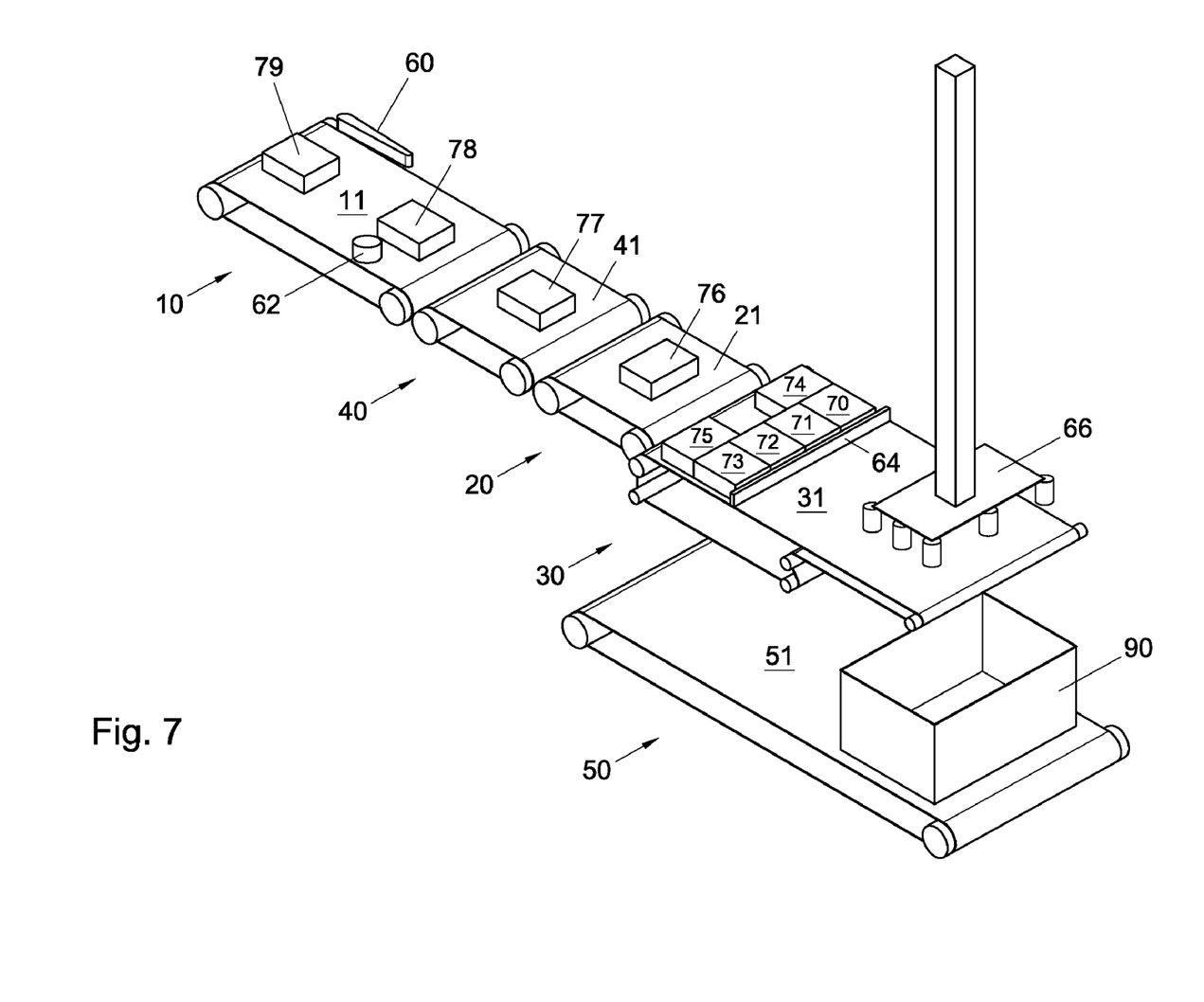
Figure 8:
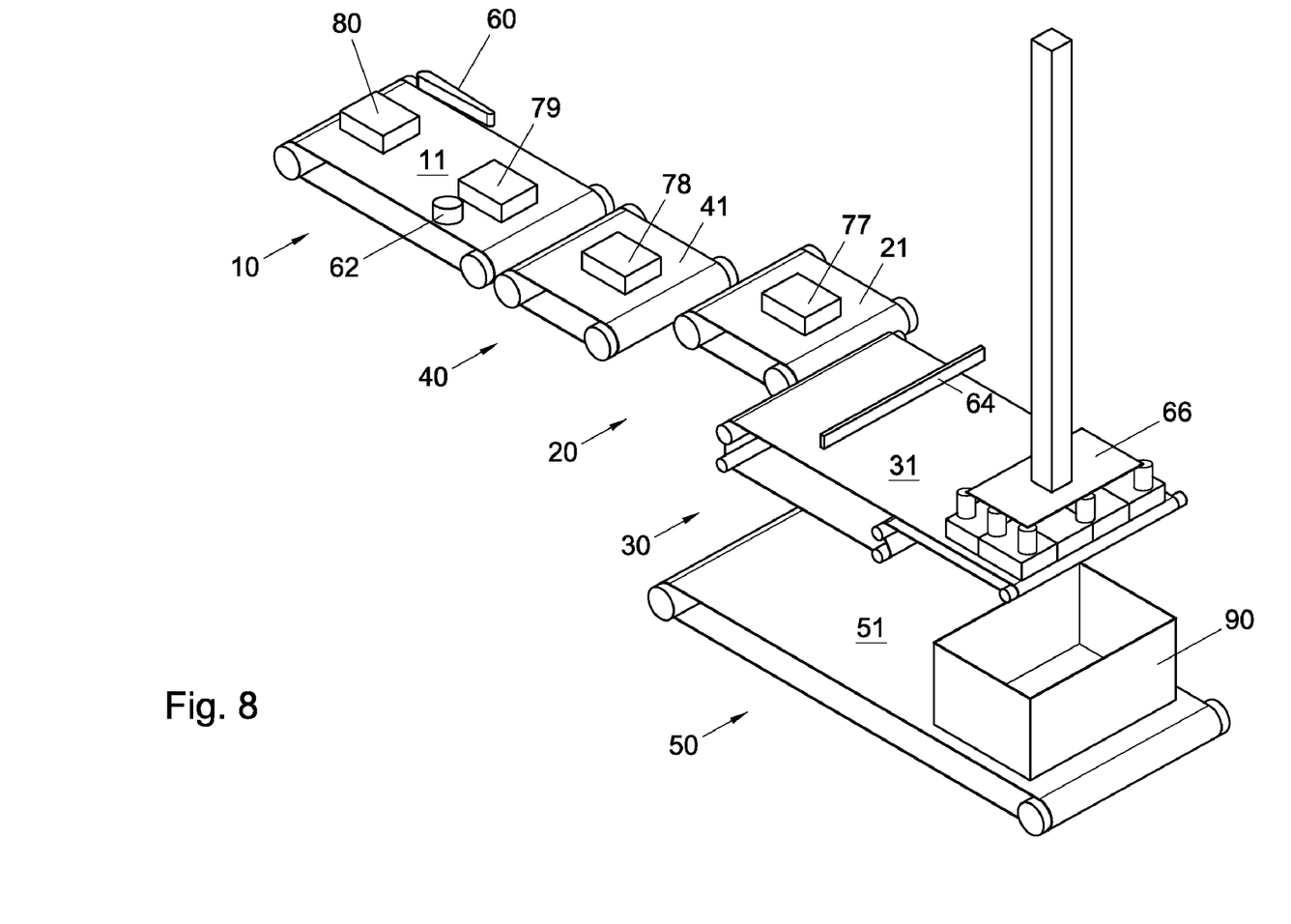

Product 74 has now been reoriented, and it is transported on to intermediate conveyor 40 (see FIG. 4). Intermediate conveyor 40 is optional, but may for example be advantageous in case the supply stream of products 70-81 exhibits irregularities, such as unevenly spaced products. In such a case, intermediate conveyor 40 may serve as a buffer conveyor for temporarily holding one or more products before transporting them on to second supply conveyor 20.

Supply conveyor 20 is responsible for delivering the product 74 to collecting conveyor 30 in such a way that it automatically slides into its predetermined place in the packing pattern of the layer being built. To this end, the second supply conveyor 20 may move laterally, in a direction substantially perpendicular to the transport direction 100, before passing on a product to collecting conveyor 3 (see FIG. 5).

Products handed over to the collecting conveyor 3 may be driven against an upstream side of stop 64, which may form a barrier for at least as long as a layer of products has not yet been completed. Ongoing motion of the product-carrying surface 31 may ensure that the products delivered to the upstream side of stop 64 are closely packed by gently driving them against each other (see FIG. 6). Once a layer of products is completed, the stop 64 may be temporarily raised to allow the layer of products to pass underneath. When the layer of products reaches the retractable portion of the product-carrying surface 31, which is located below the suction pick up head 66, conveyor 30 may be halted briefly to allow the suction pick up head 66 to engage the products (see FIG. 8). When the products are securely engaged, the retractable portion of the product-carrying surface 31 of conveyor 3 may be retracted, allowing the suction pick up head 66 to move downward and to deliver the next layer of products into the container 90 (see FIG. 9). After releasing the layer of products into the container 90, the suction pick up head 66 may be moved back into its starting position, after which the retracted portion of the product-carrying surface 31 of conveyor 3 may be extended back into its starting position as well.

The above-described process may be repeated until a container 90 has been fully packed. When container 90 has been fully packed, it may be transported away from the loading position by discharge conveyor 50, which conveyor may, at the same time, supply a new empty container to be filled.—It will be clear that the above-described process may be repeated to fill any number of containers.

Figure 9:
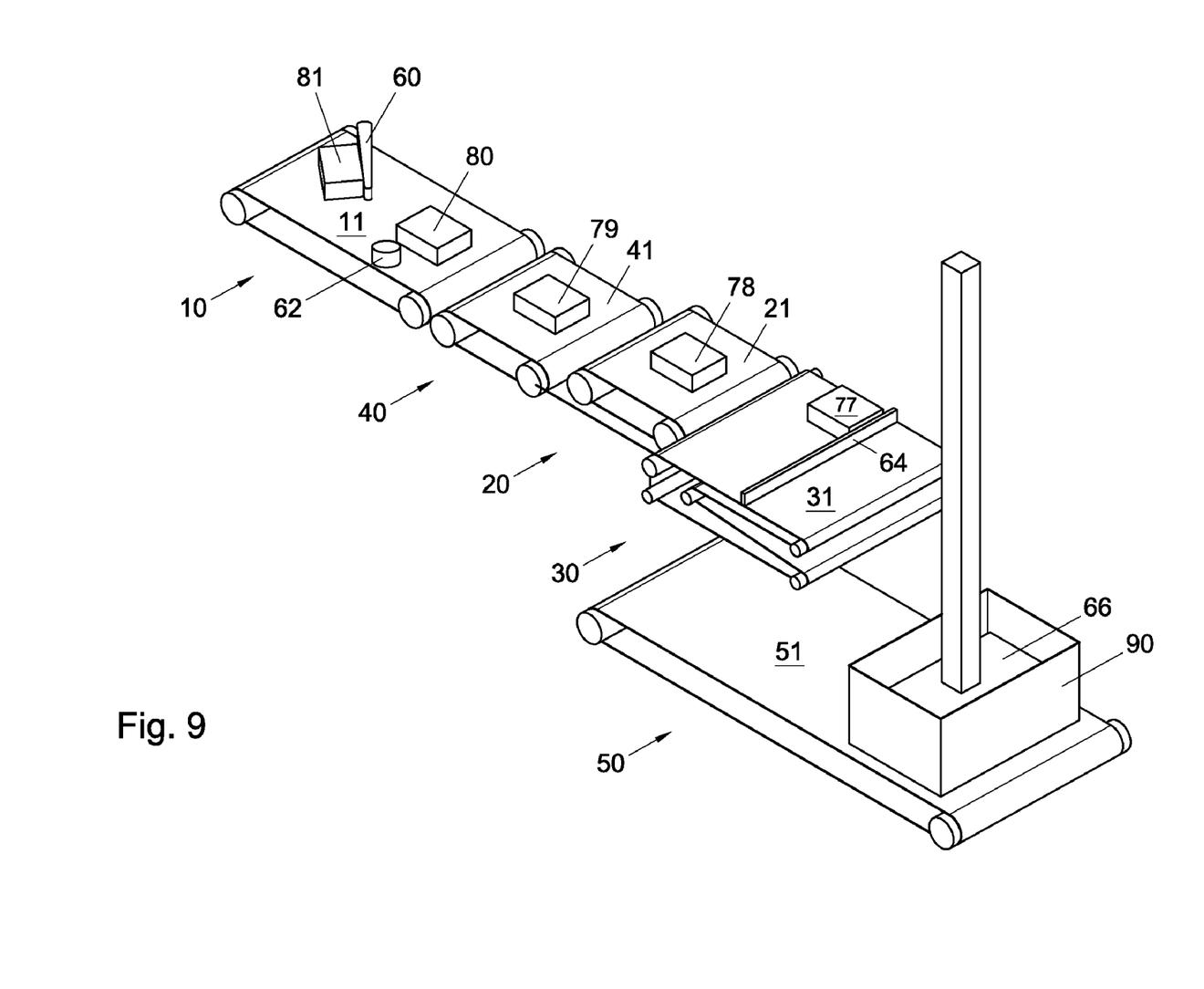

Although it is apparent from FIG. 9, it is noted explicitly that neither the steps of retracting and extending the retractable/extendable portion of collecting conveyor 30, nor its state of being retracted, endanger the continuity of the packaging process. Apart from the (optional) brief moment to allow the suction pick up head 66 to engage the products, the product-carrying surface 31 of collecting conveyor 30 may be in motion continuously.

It will be apparent to those having ordinary skill in the art that various modifications and variations can be made to the push rod retainer as disclosed herein. Other embodiments will be apparent to those having ordinary skill in the art from consideration of the specification. It is intended that the specification and examples are considered as exemplary only.

Other aspects, features and advantages will be apparent upon an examination of the attached drawings and appended claims.

What is claimed is:

1. An apparatus for packaging products into a container, comprising:
   a first supply conveyor having a first product-carrying surface that is moveable in a transport direction;
   reorientation means, associated with said first supply conveyor and configured for changing an orientation of products being transported on said first product-carrying surface;
   a second supply conveyor, disposed downstream of the first supply conveyor and having a second product-carrying surface that is moveable in both the transport direction and a direction substantially perpendicular thereto;
   a collecting conveyor, disposed downstream of the second supply conveyor and having a third product-carrying surface that is moveable in the transport direction, whereby a portion of the third product-carrying surface is extendably and retractably arranged; and
   a suction pick up head that is disposed in a substantially vertically moveable manner above the extendably and retractably arranged portion of the third product-carrying surface of the collecting conveyor, the suction pick up head being configured for engaging a layer of products to be placed into the container.

2. The apparatus according to claim 1, wherein at least one of the first supply conveyor, the second supply conveyor and the collecting conveyor is a belt conveyor.

3. The apparatus according to claim 2, further comprising:
   a control unit that exerts control over the motion of at least one of the conveyors, the reorientation means, a stop and the suction pick up head.

4. The apparatus according to claim 1, wherein the reorientation means comprise:
   a deflection device, moveable between a first position and a second position, whereby the deflection device in its first position interferes with a path of a product being transported on the first product-carrying surface, and whereby the deflection device in its second position does not interfere with the path of a product being transported on the first product-carrying surface; and
   a turn body, disposed above the first product-carrying surface and downstream of the deflection device.

5. The apparatus according to claim 4, wherein the turn body possesses a substantially smooth and rounded circumferential edge for contacting products being transported on the first product-carrying surface.

6. The apparatus according to claim 5, further comprising:
   a control unit that exerts control over the motion of at least one of the conveyors, the reorientation means, a stop and the suction pick up head.

7. The apparatus according to claim 4, further comprising:
   a control unit that exerts control over the motion of at least one of the conveyors, the reorientation means, a stop and the suction pick up head.

8. The apparatus according to claim 1, wherein a stop is associated with the collecting conveyor, said stop being moveable between a first position and a second position, such that the stop in its first position blocks the passage of products and the stop in its second position allows the passage of products being transported on the third product-carrying surface.

9. The apparatus according to claim 8, wherein the first and second positions of the stop are vertically spaced apart.

10. The apparatus according to claim 9, further comprising:
    a control unit that exerts control over the motion of at least one of the conveyors, the reorientation means, the stop and the suction pick up head.

11. The apparatus according to claim 8, further comprising:
    a control unit that exerts control over the motion of at least one of the conveyors, the reorientation means, the stop and the suction pick up head.

12. The apparatus according to claim 1, wherein the suction pick up head is detachably connected to a drive mechanism.

13. The apparatus according to claim 12, further comprising:
    a control unit that exerts control over the motion of at least one of the conveyors, the reorientation means, a stop and the suction pick up head.

14. The apparatus according to claim 1, further comprising:
    an intermediate conveyor, disposed between the first supply conveyor and the second supply conveyor.

15. The apparatus according to claim 14, further comprising:
    a control unit that exerts control over the motion of at least one of the conveyors, the reorientation means, a stop and the suction pick up head.

16. The apparatus according to claim 1, further comprising:
    a discharge conveyor, at least partially disposed below the extendably and retractably arranged portion of the third product-carrying surface of the collecting conveyor.

17. The apparatus according to claim 16, further comprising:
    a control unit that exerts control over the motion of at least one of the conveyors, the reorientation means, a stop and the suction pick up head.

18. The apparatus according to claim 1, further comprising:
    a control unit that exerts control over the motion of at least one of the conveyors, the reorientation means, a stop and the suction pick up head.

19. The apparatus according to claim 18, wherein the control unit is configured:
    to repeatedly form a layer of products on the third product-carrying surface, said layer having dimensions that substantially correspond to the dimensions of a floor area of the container to be loaded; and
    to repeatedly place a completed layer of products into the container.

* * * * *

UNITED STATES PATENT AND TRADEMARK OFFICE
CERTIFICATE OF CORRECTION

PATENT NO.        : 7,941,990 B2
APPLICATION NO.   : 12/349076
DATED             : May 17, 2011
INVENTOR(S)       : Pieter Theodorus Joseph Aquarius It is certified that error appears in the above-identified patent and that said Letters Patent is hereby corrected as shown below:

Front Page, (73) Assignee, "AP Stramproy (NL)" should read --Stramproy (NL)--;

Column 1, line 34, "that that" should read --that--;

Column 3, line 17, "a" should read --an--;

Column 4, line 5, "deflection arm 62" should read --deflection arm 60--; and

Column 5, line 4, "the to the" should read --to the--.

Signed and Sealed this
Twenty-fifth Day of October, 2011

David J. Kappos
*Director of the United States Patent and Trademark Office*